Figure 1:
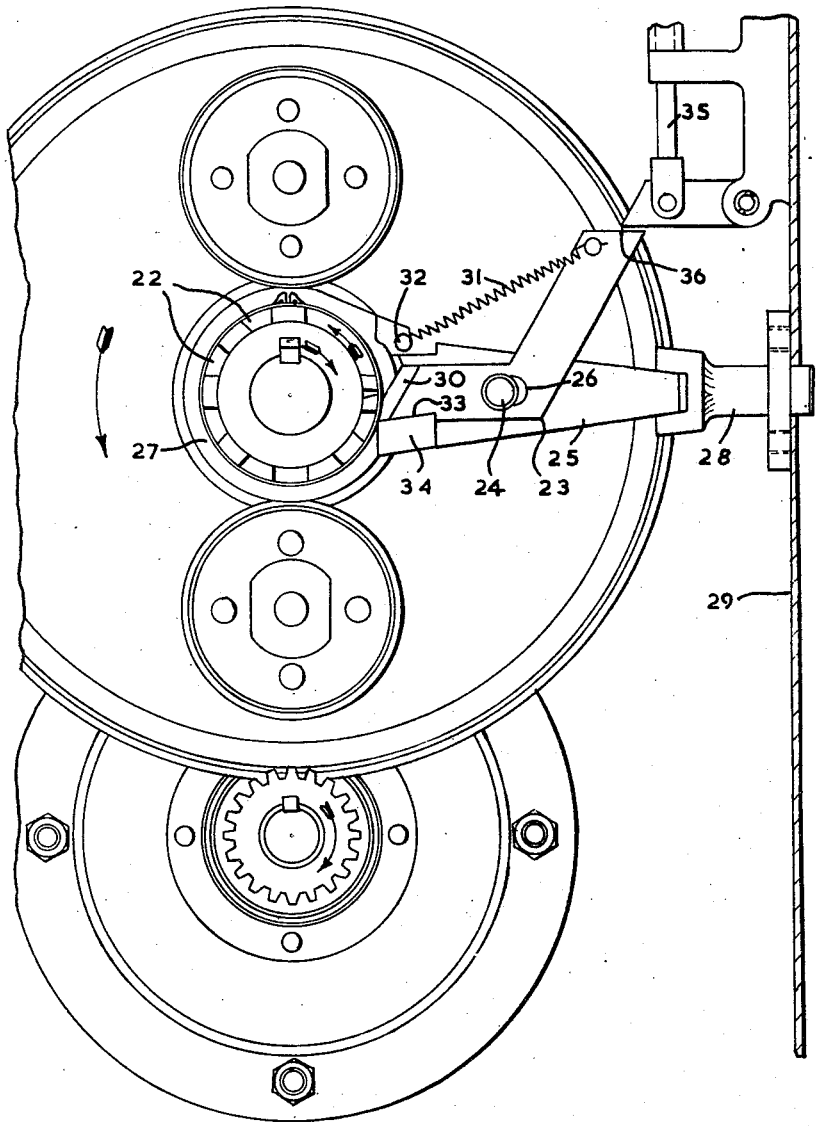

Sept. 25, 1962  A. TURLEY  3,055,235
CLUTCH

Filed Oct. 9, 1959  3 Sheets-Sheet 1

INVENTOR.
BY Alfred Turley.

ATTORNEY.

Sept. 25, 1962     A. TURLEY     3,055,235
CLUTCH

Filed Oct. 9, 1959     3 Sheets-Sheet 3

INVENTOR.
Alfred Turley.
BY
ATTORNEY.

United States Patent Office 3,055,235
Patented Sept. 25, 1962

3,055,235
CLUTCH
Alfred Turley, Bushbury, Wolverhampton, England, assignor to Vono Limited, Tipton, England, a company of Great Britain
Filed Oct. 9, 1959, Ser. No. 845,483
Claims priority, application Great Britain Oct. 21, 1958
3 Claims. (Cl. 74—781)

This invention relates to a new or improved brake for use in the transmitting of rotary motion from a driving shaft to a driven shaft and the broad object of the invention is to provide a brake which, upon operation, will cause the driven shaft to execute a predetermined angular amount of rotation and then come to rest.

With this object in view, according to the present invention, considered in its widest form, I provide an epicyclic gear assembly having a planet carrier which rotates with the driving shaft, a primary sun gear which is in driving engagement with the driven shaft, a secondary sun gear which is co-axial with said primary sun gear and is capable of rotation relative thereto, one or more sets of planet pinions mounted on said planet carrier, each set having two planet pinions one meshing with the primary sun gear and one with the secondary sun gear, a brake comprising a locking member adapted to be engaged to prevent rotation of said secondary sun gear and an ejector device associated with the driven shaft and operative to cause dis-engagement of said locking member after a predetermined angular amount of rotation of the driven shaft.

In practice, with a brake according to the above definition, the load on a driven shaft will hold such shaft still whilst the brake is dis-engaged so that the primary sun gear is held still and the epi-cyclic gear will operate so as to drive the secondary sun gear. When the locking member is engaged, however, the secondary sun gear is stopped from rotating so that the epi-cyclic gear then transmits drive to the primary sun gear and thus turns the driven shaft against its load.

The locking member may be in the form of a trigger arm which may be pivotally mounted upon a fixed part of the machine or structure with which the brake is associated and the secondary sun gear may have a plurality of angularly spaced peripheral slots, the arrangement being that the trigger arm when actuated is moved so as to bring it into engagement with one of the slots in the secondary sun gear to bring this gear to a halt.

The ejector device may, for example, comprise a cam rotating bodily with the driven shaft and arranged so that after one revolution or part of a revolution of the driven shaft such cam engages the trigger arm to move it out of a slot in the secondary sun gear. More than one cam or projection may be provided depending upon whether the driven shaft is required to be rotated for a complete revolution or part of a revolution.

Such trigger arm may be manually operated and may normally be held out of engagement by spring means holding it against a fixed stop so that when actuated it is moved away from such stop against the pressure of the spring means and is then brought into engagement with a slot and held there by the said spring means until the cam on the driven shaft engages the trigger arm to move it out of engagement and back to the position in which it engages the fixed stop.

A brake according to the present invention is capable of being used in a variety of applications where it is desired to periodically move a driven shaft for one revolution or some part of a revolution and for example, it may be used in a case where a succession of intermittent revolutions or part rotatable movements are required to index a work-table or tool and with such an arrangement, means may be provided for automatically engaging the trigger arm periodically with the slots in the sun gear, so as to provide the periodic movements of the driven shaft.

The invention is illustrated in the accompanying drawings in which it is shown as applied to a transmission which can be used in the type of machine described in prior application No. 844,448, now Patent No. 3,026,914. The machine of this prior application is used in the lacing together of coiled springs to make up a spring unit and comprises broadly upper and lower sets of clamping jaws which hold a row of springs whilst they are being laced at top and bottom to another row by means of wire helices and such machine also includes transporter mechanism for moving the laced row of springs rearwardly and bringing the fresh row of springs into the jaws.

The specific embodiment of brake shown in the drawings and described hereinafter is used in the drive of this machine to automatically bring the transporter mechanism into operation in the sequence of operations of the machine.

Figure 2:
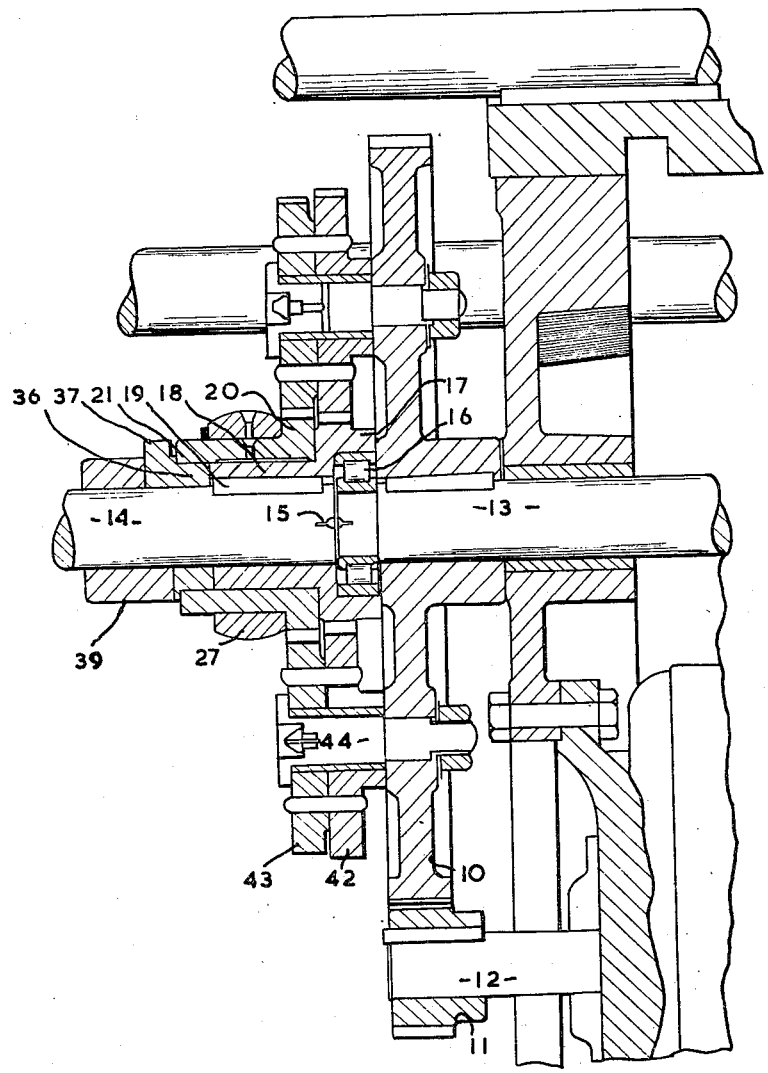
Figure 3:
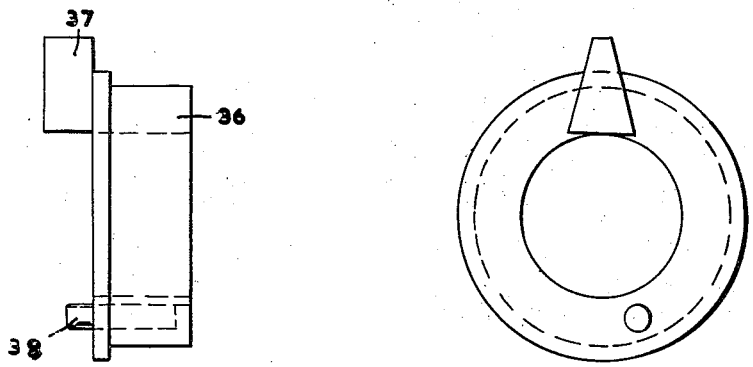
Figure 4:
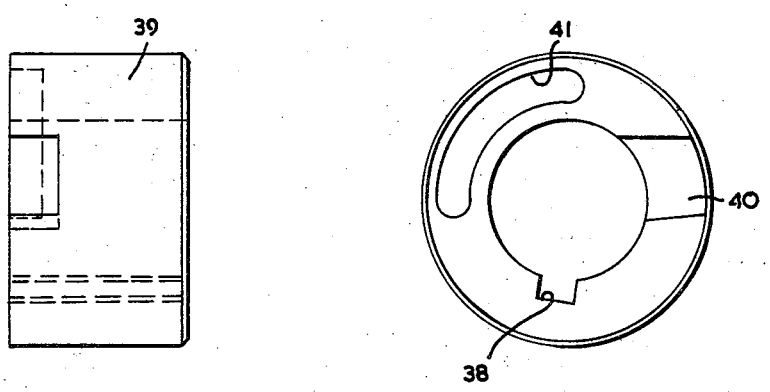

In the drawings:
FIGURE 1 is a front elevation.
FIGURE 2 is a vertical section on the centre line of FIGURE 1.
FIGURES 3 and 4 are detail views each containing side and front elevations.

Referring to FIGURES 1 and 2 the planet carrier 10 has peripheral teeth and is driven by engagement of these teeth with a pinion 11 on a main drive shaft 12 of the machine, the planet carrier itself being keyed upon a shaft 13 extending parallel to the main drive shaft 12 and various other operations of the machine may have their drive transmitted by this shaft 13 upon which the planet carrier is mounted.

The driven shaft 14 which is operatively connected to the transporter mechanism and which is required to be intermittently rotated one revolution at a time is mounted so as to be axially in line with the planet carrier shaft 13 and at its end adjacent the driven shaft 14 the planet carrier shaft 13 has an extension 15 carrying a roller bearing 16 upon which is rotatably mounted the primary sun gear 17.

This primary sun gear 17 has an axially extending sleeve portion 18 which is internally keyed at 19 to the driven shaft 14 and has its exterior formed as a rotating bearing surface for the secondary sun gear 20 which also has an axially extending sleeve portion 21 which is rotatably mounted about the sleeve portion 18 of the primary sun gear 17. At its outer end the sleeve portion 21 of the secondary sun gear is formed with a number (for example eight) of radially extending slots 22.

The trigger arm 23 which is actuated to lock the secondary sun gear 20 is in the form of a cranked lever which is pivoted at 24 to an anchor member 25 at a point near the join between the two arms of the crank lever, the trigger arm having an elongated slot 26 which is mounted about a pin fixed in the anchor member.

This anchor member includes a collar 27 which is mounted about the exterior of the secondary sun gear 20 so that the secondary sun gear can rotate inside the collar 27 and this collar has integral therewith the radially extending arm 25 upon which the trigger arm 23 is pivoted, the outer end of this arm 25 of the anchor member being held in a suitable bracket 28 fixed securely to a fixed part of the machine such as the outer casing 29.

The one end of the trigger arm has an inclined nose 30 which is adapted to make engagement with the slots 22 in the secondary sun gear 20 and the other end of the trigger arm has connected thereto one end of a spring 31, the other end of which is fixed to the anchor member at 32 and is arranged so as to normally tend to draw the trigger arm into engagement with the secondary sun gear but on its lower face the trigger arm has a recess 33 which engages with a shoulder 34 on the arm 25 of the anchor member, so as normally to hold the nose 30 of the trigger arm out of engagement with the secondary sun gear 20.

Any convenient means may be provided for causing pivotal movement of the trigger arm such as a spring loaded plunger 35 mounted above the outer end of the trigger arm and adapted to be operated automatically such as by a solenoid or manually by an operating handle to depress it and cause it to engage the outer end 32 of the trigger arm which movement raises the other end of the trigger arm so as to dis-engage the recess 33 from the shoulder 34 on the anchor member and allow the pull of the spring 31 to draw the nose 30 of the trigger arm into engagement with a slot 22 in the secondary sun gear.

The ejector device (see also FIGS. 3 and 4) for releasing the trigger arm from such engagement is made in two parts and comprises a cam sleeve 36 which is mounted about the driven shaft 14 and has on one end face a radially projecting cam nose 37 and on the opposite side of the sleeve has fixed therein an axially projecting peg 38.

The second part of the ejector device comprises a cam collar 39 which is in the form of a sleeve keyed at 38 to the driven shaft 14 and having a radially extending slot 40 to which fits the cam nose 37 on the cam sleeve 36, this slot 40 being greater in width than the nose 37 on the cam sleeve and the cam collar 39 being further provided with the part-circular slot 41 extending through about 90° of arc and arranged so that the peg 38 on the cam collar normally engages in one end of this slot 41, there being a coiled compression spring (not shown) engaged in the slot 41 and engaging the peg so as to urge it into engagement with the one end of the slot 41.

The purpose of this arrangement for the ejector device is to ensure that the driven shaft 14 will make a complete revolution of no less than 360° before the nose 30 of the trigger arm is disengaged from a slot 22 in the secondary sun gear 20. When the nose of the trigger arm has been so engaged and the secondary sun gear 20 has been brought to rest, the rotation of the driven shaft 14 will carry the cam nose 37 around until it comes into engagement with the nose 30 on the trigger arm whereupon the peg 38 on the cam sleeve will move relatively to the cam collar 39 to compress the spring in the arcuate slot 41 and allow the cam nose 37 to move relatively in the slot 40 in the cam collar 39 thus achieving an increment of rotation of the driven shaft 14 before the cam nose 37 snaps past the nose 30 on the trigger arm and forces it out of engagement, thereby ensuring that the full 360° of rotation is achieved.

The planet carrier 10 may have any desired number of planet pinions thereon, a suitable number (as shown) being two sets of planet pinions at diametrically opposed positions, each set comprising two pinions (42, 43) locked together side-by-side and mounted rotatably upon a suitable stub axle 44 fixed in the planet carrier 10, one pinion 42 of the set engaging the primary sun gear 17 and the other pinion 43 of the set engaging the secondary sun gear 20.

When the nose 30 of the trigger arm is out of engagement the rotation of the planet carrier 10 results in drive being transmitted to the secondary sun gear 20 as the primary sun gear 17 is held stationary by virtue of the load on the drive shaft 14 but when the trigger arm is operated to lock the secondary sun gear 20, the drive is then transmitted to the primary sun gear 17 and thus to the driven shaft 14.

What I claim then is:

1. A brake for use in a planetary gear set for periodically transmitting a set amount of angular rotation to a driven shaft from a continuously rotating driving shaft comprising an epicyclic gear having a planet carrier rotating with the driving shaft, a primary sun gear keyed to the driven shaft and co-axial with the planet carrier, a secondary sun gear loose upon the driven shaft and co-axial with the primary sun gear, planet pinions mounted on said planet carrier and meshing with said primary and secondary sun gears, said secondary sun gear having a peripheral part provided with a plurality of angularly spaced slots, a stationary support, a trigger arm pivotally mounted upon said support, means for periodically actuating said trigger arm to engage with one of said slots to prevent rotation of the secondary sun gear, and an ejector device for disengaging said trigger arm after a set amount of angular rotation of the driven shaft, said ejector device comprising a cam sleeve mounted loosely about the driven shaft, a radially outwardly projecting cam nose on said cam sleeve for engaging said trigger arm to displace it from locking engagement with the secondary sun gear, a cam collar mounted about and keyed to the driven shaft, and means on said cam sleeve and said cam collar for rotating said cam sleeve, said means including a lost-motion connection between the cam sleeve and the cam collar.

2. A brake for use in a planetary gear set for periodically transmitting a set amount of angular rotation to a driven shaft from a continuously rotating driving shaft comprising an epicyclic gear having a planet carrier rotating with the driving shaft, a primary sun gear keyed to the driven shaft and co-axial with the planet carrier, a secondary sun gear loose upon the driven shaft and co-axial with the primary sun gear, planet pinions mounted on said planet carrier and meshing with said primary and secondary sun gears, said secondary sun gear having a peripheral part provided with a plurality of angularly spaced slots, a stationary support, a trigger arm pivotally mounted upon said support, means for periodically actuating said trigger arm to engage with one of said slots to prevent rotation of the secondary sun gear, an ejector device for disengaging said trigger arm after a set amount of angular rotation of the driven shaft, said ejector device comprising a cam sleeve mounted loosely about the driven shaft, a radially outwardly projecting cam nose on said cam sleeve for engaging said trigger arm to displace it from locking engagement with the secondary sun gear, a peg projecting parallel to the axis of the sleeve from one end thereof, a cam collar mounted about and keyed to the driven shaft, said cam collar having a radially extending slot in one end face in which said cam nose loosely engages and an arcuate slot in said end face in which said peg engages and a spring in said slot which normally holds said peg in engagement with one end of said slot.

3. A planetary gear control for permitting intermittent transmission of angular rotation to a driven shaft from a continuously rotating driving shaft comprising a planetary gear set consisting of a plurality of gears drivingly connecting said driven and driving shafts, the first of said gears being keyed to the driven shaft, the second of said gears rotatably mounted on said first gear, said second gear having a series of spaced slots, a stationary support, a trigger arm movably mounted on said support for engaging one of the slots of said second gear, means for moving said trigger arm into engagement with said slots, an ejector for moving said trigger arm out of engagement with said slots and including cam means rotatably mounted on the driven shaft, a collar fixed to the driven shaft, and lost motion means between said cam means and said collar whereby said cam means is intermittently rotated for ejecting said trigger arm.

References Cited in the file of this patent

UNITED STATES PATENTS

| | | |
|---|---|---|
| 1,920,956 | Burton | Aug. 8, 1933 |
| 2,611,886 | Kamper | Sept. 23, 1952 |
| 2,870,646 | Miyazawa | Jan. 27, 1959 |

FOREIGN PATENTS

| | | |
|---|---|---|
| 324,235 | Italy | June 25, 1935 |